United States Patent [19]

Kluth et al.

[11] Patent Number: 4,533,490
[45] Date of Patent: Aug. 6, 1985

[54] PROCESS FOR PRODUCING WATER GLASS FOAMS FROM AEROSOL CONTAINERS

[75] Inventors: Hermann Kluth; Bernhard Röderhoff, both of Dusseldorf; Wolfgang Friedemann, Neuss; Jürgen Wegner; Wolfgang Dierichs, both of Dusseldorf, all of Fed. Rep. of Germany

[73] Assignee: Henkel Kommanditgesellschaft auf Aktien, Dusseldorf, Fed. Rep. of Germany

[21] Appl. No.: 515,040

[22] Filed: Jul. 19, 1983

[30] Foreign Application Priority Data

Dec. 2, 1982 [DE] Fed. Rep. of Germany ....... 3244523

[51] Int. Cl.$^3$ ...................... B01J 13/00; C04B 43/00; C09K 3/30
[52] U.S. Cl. ...................................... 252/305; 252/62; 252/307; 261/DIG. 26; 427/244; 501/84
[58] Field of Search ........................ 252/305, 307, 62; 261/DIG. 26; 501/84

[56] References Cited

U.S. PATENT DOCUMENTS 3,341,418  9/1967  Moses et al. ................ 252/305 X
3,679,599  7/1972  Goldsmith .................... 252/305
3,725,095  4/1973  Weidman et al. .............. 501/84
3,839,220 10/1974  Barchas ........................ 252/305
3,951,834  4/1976  Gillilan ......................... 252/62

FOREIGN PATENT DOCUMENTS 0042128 12/1981  European Pat. Off. .
2039736  3/1971  Fed. Rep. of Germany .
2226841 12/1973  Fed. Rep. of Germany .
2226640 12/1973  Fed. Rep. of Germany .
2948778  6/1981  Fed. Rep. of Germany .

Primary Examiner—Richard D. Lovering
Attorney, Agent, or Firm—Ernest G. Szoke; Nelson Littell, Jr.

[57] ABSTRACT

A process for producing in situ foams based on alkali metal silicates characterized in that an aqueous alkali metal silicate solution on the one hand and a hardener solution on the other hand are accomodated in separate pressurized containers A and B, prior to use the hardener solution in container B is added to and mixed with the silicate solution in container A in the presence of a suitable emulsifier for foam formation and a propellent gas liquid under high pressure between 0° and 50° C., and, on actuation of the discharge valve of container A, an alkali metal silicate foam is discharged. The alkali metal silicate foams formed are distinguished by non-inflammability, high temperature stability and good heat-insulating properties and are used as a filling, construction and insulating material or the like in the building industry.

19 Claims, No Drawings

PROCESS FOR PRODUCING WATER GLASS FOAMS FROM AEROSOL CONTAINERS

BACKGROUND OF THE INVENTION

This invention relates to a process for producing foams based on alkali metal silicates by mixing the foam-forming components originally present in two separate pressurized containers and expelling the waterglass foam by means of a propellent gas liquefied under pressure at room temperature.

Various methods and various propellents and hardening agents for producing waterglass foams are described in the Patent literature. In this connection, a distinction has to be drawn between two fundamentally different procedures: on the one hand, chemical foaming where the propellent is formed for example by the decomposition of peroxides, preferably $H_2O_2$, by metal powders or other reducing agents (DE-OS No. 22 27 640) or by the decomposition of carbides in aqueous solution (DE-OS No. 22 26 841); on the other hand, physical foaming where foaming is obtained by the injection of gases, for example air (DE-OS No. 20 39 736), or by heating (DE-OS No. 29 48 778).

Both procedures require elaborate machinery for metering and mixing several components (waterglass solution, hardener, propellent). Although they are suitable for the production of silicate foam products on an industrial scale, they are not really suitable for the production of silicate foams in situ, i.e. on site in the building industry for example. However, it is precisely in that field where silicate foams could be effectively used by virtue of their undisputed advantages over organic polymer materials (better temperature resistance without releasing toxic gases or smoke, non-inflammability, better processibility for the same insulation and construction properties). Above all, there is no known method for the simple production of in situ waterglass foams.

OBJECTS OF THE INVENTION

An object of the present invention is to overcome the deficiencies of the prior art and develop a simple method of in situ waterglass foam production.

Another object of the present invention is the development of a process for producing in situ foams based on alkali metal silicates comprising (1) mixing an aqueous alkali metal silicate solution, with a propellent gas which is liquid under pressure between 0° and 50° C., under sufficient pressure to maintain said propellent gas in liquid state, (2) just prior to foaming, adding to said aqueous alkali metal silicate solution a hardener solution while maintaining or increasing said pressure, (3) mixing said aqueous alkali metal silicate solution and said hardener solution in the presence of a suitable emulsifier for foam formation, and (4) applying said mixture of step (3) to a surface whereby said propellent gasifies on release of said pressure forming an in situ foam based on alkali metal silicates, where the amount and type of said hardener is so selected that the "pot life" of said mixture of step (3) before hardening is longer than the time required to apply all of said mixture of step (3) to a surface.

A further object of the present invention is the development of a process for producing in situ foams based on alkali metal silicates characterized in that an aqueous alkali metal silicate solution on the one hand and a hardener solution on the other hand are accomodated in separate pressurized containers A and B, prior to use the hardener solution in container B is added to and mixed with the silicate solution in container A in the presence of a suitable emulsifier for foam formation and a propellent gas liquid under high pressure between 0° and 50° C., and, on actuation of the discharge valve of container A, an alkali metal silicate foam is discharged.

These and other objects of the invention will become more apparent as the description thereof proceeds.

DESCRIPTION OF THE INVENTION

The present invention relates to a process for producing in situ foams based on alkali metal silicates characterized in that an aqueous alkali metal silicate solution on the one hand and a hardener solution on the other hand are accomodated in separate pressurized containers A and B, prior to use the hardener solution in container B is added to and mixed with the silicate solution in container A in the presence of a suitable emulsifier for foam formation and a propellent gas liquid under high pressure between 0° and 50° C., and, on a actuation of the discharge valve of container A, an alkali metal silicate foam is discharged.

More particularly, the present invention relates to a process for producing in situ foams based on alkali metal silicates comprising (1) mixing an aqueous alkai metal silicate solution, with a propellent gas which is liquid under pressure between 0° and 50° C., under sufficient pressure to maintain said propellent gas in liquid state, (2) just prior to foaming, adding to said aqueous alkali metal silicate solution, a hardener solution while maintaining or increasing said pressure, (3) mixing said aqueous alkali metal silicate solution and said hardener solution in the presence of a suitable emulsifier for foam formation, and (4) applying said mixture of step (3) to a surface whereby said propellent gasifies on release of said pressure forming an in situ foam based on alkali metal silicates, where the amount and type of said hardener is so selected that the "pot life" of said mixture of step (3) before hardening is longer than the time required to apply all of said mixture of step (3) to a surface.

The principle underlying the invention is to emulsify a gas which is liquefied under pressure between 0° and 50° C., preferably at room temperature, in an aqueous waterglass solution in an aerosol container A and to force the hardener component into the container A by excess pressure in order to initiate the hardening reaction. Preferably the hardener component is contained in a separate container B.

The container B may also be an aerosol container or a special plastic container and, in addition, may be accommodated as an inner container in the aerosol container A in accordance with EP A No. 0 042 128. In this case, the hardener is transferred to container A by turning a spindle or by actuating a special valve. After the waterglass solution, propellent and hardener have been emulsified by shaking the container as a whole, the physical foaming process is initiated by actuating the aerosol valve to expel the mixture and to vaporize the liquefied gas serving as propellent. At the same time, the hardening reaction which begins after some delay results in solidification of the foam. The foam acquires its ultimate strength through physical hardening (release of water).

Sodium silicate and/or potassium silicate solutions are preferably used for producing the waterglass foams.

Alkali metal silicate solutions in which the molar ratio of $SiO_2$ to $Na_2O$ amounts to between 2 and 4:1 and preferably to between 2.5 and 3.5:1 or the molar ratio of $SiO_2$ to $K_2O$ to between 2.8 and 4:1 and preferably to between 3.2 and 3.5:1, are used in the process according to the invention. The total solids content of the solution amounts to between 27% and 50% by weight, so that the solution at 20° C. has a density of from 1.25 to 1.60 g/cc and a viscosity of from 10 to 5000 mPa.s and preferably from 50 to 1000 mPa.s. To improve the mechanical strength of the foams formed, quaternary ammonium compounds, borates and/or synthetic resins and also alkali-compatible organic and/or inorganic compounds may optionally be added to the alkali metal silicate solutions. Commercially available synthetic resin dispersions, such as for example styrene-acrylate dispersions, styrene-butadiene dispersions or polymers containing vinyl acetate, are preferably used for this purpose.

Hardeners suitable for use in accordance with the invention may be both organic and inorganic, liquid or gaseous. Suitable organic hardeners include, in particular, esters which split off acids under the effect of alkalis, such as glycerol triacetate for example. The dimethyl esters of oxalic acid, succinic acid, glutaric acid and adipic acid may also be used as hardeners, although they give waterglass foams of lower strength. In admixture with glycerol triacetate, they may be used for regulating the "pot life", i.e. the period of time elapsing between addition of the hardener to the silicate solution and hardening. Oxides or salts of polyvalent cations, for example zinc, magnesium or calcium, may also be added to the carboxylic acid esters. For example, zinc oxide may be used for this purpose.

In principle, it is also possible to introduce the hardener component into the alkali metal silicate solution in microencapsulated form. Microcapsules soluble in alkalis or in the propellent guarantee release of the hardener component when used in accordance with the invention.

In the preferred embodiment of the invention, however, the hardener component is accommodated in one of the two pressurized containers, for example an aerosol container. The hardener component is added to the alkali metal silicate solution using a propellent or propellent mixture which is gaseous above 0° C. and preferably at room temperature, for example nitrogen or carbon dioxide. In addition, this hardener/propellent combination may be mixed with a propellent which is liquefied under high pressure between 0° and 50° C. and preferably at room temperature.

A propellent is also used for expelling the alkali metal silicate/hardener mixture from the pressurized container A in the application of the waterglass foams in accordance with the invention. The propellent in question must be resistant to hydrolysis and alkalis and may consist of any of the propellents normally used for this purpose, for example dichlorodifluoromethane, dimethyl ether, propane/butane, optionally together with additions of other propellents, for example trichlorofluoromethane.

To carry out the process in accordance with the invention, it is particularly important uniformly to distribute or emulsify the propellent and the hardener in the aqueous phase. To this end, special emulsifiers have to be added to the waterglass/propellent/hardener mixture. Suitable emulsifiers are emulsifiers which are stable to alkalis and which, when mixed with waterglass, do not produce any increase in viscosity in the waterglass or any precipitations (gel formation) in the waterglass. An emulsion should be formed without any thickening when the aerosol container is shaken to mix the waterglass solution with the other components. According to the invention, the emulsifiers required for foam formation may be present in the pressurized container A and/or in the pressurized container B. To this end, they must be compatible with the alkali metal silicate solution, the hardener and the propellent gas and should not cause any precipitations in the alkali metal silicate system.

The emulsifiers used are nonionic, anionic, cationic and/or amphoteric surfactants (surface active compounds) known per se. Preferred emulsifiers are adducts of fatty alcohols with ethylene oxide, for example adducts of oleylcetyl alcohol with from 2 to 5 mols of ethylene oxide, quaternary ammonium salts containing one or two linear $C_{12-17}$ alkyl radicals, such as distearyl dimethyl ammonium chloride or lauryl trimethyl ammonium chloride, also monoesters of sulfosuccinic acid with tallow fatty acid monoethanolamide.

The silicate foams obtained by the process according to the invention are distinguished by high thermal stability (up to 300° C.) after hardening. According to DIN 4102, they are class A 2 building materials (noninflammable building materials). The thermal conductivity of various air-dry silicate foams hardened at room temperature amounted to between 0.043 and 0.068 w/m.K, depending upon the gross density of the foam and its moisture content.

The process according to the invention is illustrated by the following Examples which are to be deemed limitative in any respect.

EXAMPLES

A. Description of the process

The waterglass solution, emulsifier, propellent and, optionally other additives according to the invention were introduced into an aerosol container to form component A.

The hardener and, optionally, other additives according to the invention were introduced into a second aerosol container and adjusted with nitrogen to a pressure of approximately 10 bars (component B).

After hardener component B had been injected into component A, the contents of both container were shaken by hand for about 1 minute, thereby homogenizing the reaction mixture. In the period of time elapsing between the end of shaking and the beginning of hardening (pot life), the foam-forming reaction mixture could be expelled from the aerosol container through a lever-operated valve.

The composition of the mixtures according to the invention and the pot lives and gross densities obtained are shown in the following Examples.

The following emulsifiers were used in the process according to the invention;
Emulgin 0 2 oleyl-cetyl alcohol +2 mols of EO
Emulgin 0 5 oleyl-cetyl alcohol +5 mols of EO
Elfanol 510 sulfosuccinic acid monoester with tallow fatty acid monoethanolamide
Dehyquart C lauryl pyridinium chloride
Dehyquart DAM distearyl dimethyl ammonium chloride
Dehyquart LT lauryl trimethyl ammonium chloride

B. Assessment criteria

1. Foam formation

If little or no foam was formed on discharge of the product from the aerosol can, foam formation was rated as "−". Satisfactory to very good foam formation was rated as "+".

2. Foam stability

Foam stability characterizes the possible collapse of the fresh, unhardened foam and is defined as the period of time in which no significant collapse of the foam could be observed (i.e. ≦10% reduction in volume).

| Foam stability | rating |
|---|---|
| <5 minute | − |
| >5 <15 minutes | + |
| >15 <30 minutes | ++ |
| >30 minutes | +++ |

3. Foam structure

The structure of the foam after hardening and drying (approximately 3 days at 25±5° C.) was visually assessed. A fine-cell foam structure was rated as "+", a coarser and/or more irregular foam structure was rated as "o" and a very coarse foam structure unsuitable for technical purposes was rated as "−".

C. Examples

The composition of the individual components in the following Tables is expressed in grams.

| Example No. | 1 | 2[a] | 3 | 4 | 5 | 6 |
|---|---|---|---|---|---|---|
| Component A | | | | | | |
| Sodium waterglass solution 37/40 | 400.0 | 425.0 | 482.5 | 472.5 | 447.5 | 422.5 |
| Emulgin 02 | — | 2.5 | — | — | — | — |
| Emulgin 05 | 5.0 | 5.0 | 2.5 | 2.5 | 2.5 | 2.5 |
| Dichlorodifluoromethane | 95.0 | 57.5 | 15.0 | 25.0 | 50.0 | 75.0 |
| Component B | | | | | | |
| Glycerol Tri-acetate | 30.0 | 32.0 | 36.0 | 35.0 | 33.0 | 32.0 |
| Nitrogen | 1.2 | 1.2 | 1.2 | 1.2 | 1.2 | 1.2 |
| Carbon dioxide | — | — | — | — | — | — |
| Pot life at 20° C., minutes | 30 | 30 | 25 | 25 | 25 | 30 |
| Gross density of the air-dry foam (kg/m³) | 52 | 50–60 | 154 | 131 | 62 | 47 |

[a]Component A additionally contains 10.0 g of an aqueous acrylic resin solution (Plexitex[R])

| Example No. | 7 | 8 | 9 | 10 | 11 | 12 |
|---|---|---|---|---|---|---|
| Component A | | | | | | |
| Sodium waterglass solution 37/40 | 397.5 | 347.5 | 249.0 | 400 | 400 | 400 |
| Emulgin 02 | 2.5 | 2.5 | 2.0 | 10 | 10 | 10 |
| Emulgin 05 | | | | | | |
| Dichlorodifluoromethane | 100.0 | 150.0 | 249.0 | 90 | 90 | 90 |
| Component B | | | | | | |
| Glycerol tri-acetate | 30.0 | 26.0 | 18.7 | 30 | 30 | 30 |
| Nitrogen | 1.2 | 1.2 | 1.2 | 1.2 | 1.0 | |
| Carbon dioxide | — | — | — | — | 1.2 | 2.2 |
| Pot life at 20° C./minutes | 30 | 30 | 30 | approx 30 | approx 25 | approx 20 |
| Gross density of air-dry foam (kg/m³) | 52 | 75 | 93 | 48–50 | 51–74 | 46–89 |

| Example No. | 13 | 14 | 15 | 16 | 17 |
|---|---|---|---|---|---|
| Component A | | | | | |
| Sodium waterglass solution 50/52 | 400 | 400 | 400 | — | — |
| Sodium waterglass solution 48/50 (HF) | — | — | — | 400 | 400 |
| Sodium waterglass solution 37/40 | — | — | — | — | — |
| Emulgin 02 | | | | | |
| Emulgin 05 | 10 | 10 | 10 | 10 | 10 |
| Dichlorodifluoromethane | 90 | 90 | 90 | 90 | 90 |
| (a)[1] | | | | | |
| (b)[2] | | | | | |
| (c)[3] | | | | | |
| Component B | | | | | |
| Glycerol triacetate | 30 | 26.6 | 23.8 | 26.6 | 23.8 |
| Oxalic acid dimethyl ester | — | 3.4 | 6.2 | 3.4 | 6.2 |
| Zinc oxide | | | | | |
| Nitrogen | 1.2 | 1.2 | 1.2 | 1.2 | 1.2 |
| Pot life at 20° C., minutes | (>24h) | 420 | 300 | 180 | 90 |
| Gross density of the air-dry foam (kg/m³) | — | 55 | 63 | 280 | 40 |

[1]Acronol 290 D[R] (styrene/acrylate dispersion)
[2]Synthomer 6210[R] (styrene-butadiene dispersion)
[3]Vinnapas LL-521-1[R] (vinyl acetate copolymer dispersion)

| Example No. | 18 | 19 a/b | 20 | 21 | 22 |
|---|---|---|---|---|---|
| Component A | | | | | |
| Sodium waterglass solution 50/52 | — | — | — | — | — |
| Sodium waterglass solution 48/50 (HF) | 400 | | | | |
| Sodium waterglass solution 37/40 | — | 390/390 | 390 | 390 | 400 |
| Emulgin 02 | | | | | 5 |
| Emulgin 05 | 10 | 10/10 | 10 | 10 | 5 |
| Dichlorodifluoromethane | 90 | 90/90 | 90 | 90 | 90 |
| (a)[1] | | 10/20 | | | |
| (b)[2] | | | 10 | | |
| (c)[3] | | | | 10 | |
| Component B | | | | | |
| Glycerol triacetate | 21.6 | 29/28 | 29 | 29 | 30 |
| Oxalic acid dimethyl ester | 8.4 | | | | |
| Zinc oxide | | | | | 4 |
| Nitrogen | 1.2 | 1.2/1.2 | 1.2 | 1.2 | 1.2 |
| Pot life at 20° C., minutes | 10 | 35/35 | 30 | 35 | 25 |
| Gross density of the air-dry foam (kg/m³) | 40 | 130/130 | 122 | 130 | 56 |

[1]Acronal 290 D[R] (styrene/acrylate dispersion)
[2]Synthomer 6210[R] (styrene-butadiene dispersion)
[3]Vinnapas LL-521-1[R] (vinyl acetate copolymer dispersion)

| Example No. | 23 | 24 | 25 | 26 | 27 | 28 |
|---|---|---|---|---|---|---|
| Component A | | | | | | |
| Sodium waterglass solution 37/40 | 200 | 200 | 200 | 200 | 200 | 200 |
| Emulgin 02 | 5.0 | | | | | |
| Emulgin 05 | | 2.0 | 5.0 | 5.0 | 5.0 | 5.0 |
| Dichlorodifluoromethane | 50 | 50 | 10 | 15 | 20 | 25 |

-continued

| Example No. | 23 | 24 | 25 | 26 | 27 | 28 |
|---|---|---|---|---|---|---|
| (a)$^1$ | | | | | | |
| (b)$^2$ | | | | | | |
| (c)$^3$ | | | | | | |
| (d)$^4$ | | | | | | |
| (e)$^5$ | | | | | | |
| Component B | | | | | | |
| Glycerol tri-acetate | 15.0 | 15.0 | 15.0 | 15.0 | 15.0 | 15.0 |
| Nitrogen | (f) | (f) | (f) | (f) | (f) | (f) |
| Pot life at 25° C., minutes | 20 | 20 | 20 | 20 | 20 | 20 |
| Gross density of air-dry foam (kg/m$^3$) | 55 | 52 | 130 | 93 | 72 | 52 |

$^1$Chloroparaffin 40
$^2$Glycerol
$^3$Ethylene glycol
$^4$Acronal 290D$^{(R)}$ (styrene-acrylate dispersion)
$^5$Plexitex$^{(R)}$ (acrylic resin solution)
(f) Adjustment of the nitrogen pressure in container B to 10 bars

| Example No. | 29 | 30 | 31 | 32 | 33 | 34 |
|---|---|---|---|---|---|---|
| Component A | | | | | | |
| Sodium waterglass solution 37/40 | 200 | 200 | 200 | 200 | 200 | 200 |
| Emulgin 02 | | | | | 1.2 | 1.2 |
| Emulgin 05 | 5.0 | 5.0 | 5.0 | 5.0 | 2.4 | 2.4 |
| Dichlorodifluoromethane | 30 | 35 | 40 | 50 | 50 | 50 |
| (a)$^1$ | | | | | | |
| (b)$^2$ | | | | | | |
| (c)$^3$ | | | | | | |
| (d)$^4$ | | | | | | |
| (e)$^5$ | | | | | | 5.0 |
| Component B | | | | | | |
| Glycerol tri-acetate | 15.0 | 15.0 | 15.0 | 15.0 | 15.0 | 15.0 |
| Nitrogen | (f) | (f) | (f) | (f) | (f) | (f) |
| Pot life at 25° C., minutes | 20 | 20 | 20 | 20 | 20 | 25 |
| Gross density of air-dry foam (kg/m$^3$) | 55 | 46 | 51 | 52 | 50 | 55 |
| Remarks: | | | | | 6 | 7 |

$^1$Chloroparaffin 40
$^2$Glycerol
$^3$Ethylene glycol
$^4$Acronal 290D$^{(R)}$ (styrene-acrylate dispersion)
$^5$Plexitex$^{(R)}$ (acrylic resin solution)
(f) Adjustment of the nitrogen pressure in container B to 10 bars
$^6$ Improved stability under load in vertical gaps
$^7$ Relatively low water uptake

| Example No. | 35 | 36 | 37 | 38 |
|---|---|---|---|---|
| Component A | | | | |
| Sodium waterglass solution 37/40 | 200 | 200 | 200 | 200 |
| Emulgin 02 | 1.2 | 1.2 | 1.2 | 1.2 |
| Emulgin 05 | 2.4 | 2.4 | 2.4 | 2.4 |
| Dichlorodifluoromethane | 50 | 50 | 50 | 50 |
| (a)$^1$ | | | | |
| (b)$^2$ | 5.0 | | | |
| (c)$^3$ | | 5.0 | | |
| (d)$^4$ | | | 5.0 | |
| (e)$^5$ | | | | 5.0 |
| Component B | | | | |
| Glycerol tri-acetate | 15.0 | 15.0 | 15.0 | 15.0 |
| Nitrogen | (f) | (f) | (f) | (f) |
| Pot life at 25° C., minutes | 15 | 10 | 25 | 24 |
| Gross density of the air-dry foam (kg/m$^3$) | approx 70 | approx 90 | approx 80 | approx 50 |
| Remarks: | | Greater strength | | Improved flow behaviour |

$^1$Chloroparaffin 40
$^2$Glycerol
$^3$Ethylene glycol
$^4$Acronal 290D$^{(R)}$ (styrene-acrylate dispersion)
$^5$Plexitex$^{(R)}$ (acrylic resin solution)
(f) Adjustment of the nitrogen pressure in container B to 10 bars

| Example No. | 39 | 40 | 41 | 42 | 43 | 44 |
|---|---|---|---|---|---|---|
| Component A | | | | | | |
| Waterglass (type) | HK30 | 37/40PE | 40/42 | 43/45 | 47/48 | 48/50 |
| Waterglass (quantity used) | 200 | 200 | 200 | 200 | 200 | 200 |
| Alkali metal in the waterglass | Na | Na | Na | Na | Na | Na |
| Emulgin 05 | 5.0 | 5.0 | 5.0 | 5.0 | 5.0 | 5.0 |
| Dichlorodifluoromethane | 50 | 50 | 50 | 50 | 50 | 50 |
| Component B | | | | | | |
| Glycerol tri-acetate | 15.0 | 15.0 | 15.0 | 15.0 | 15.0 | 15.0 |
| Nitrogen | (a) | (a) | (a) | (a) | (a) | (a) |
| Pot life at RT, minutes | 20 | 40 | 30 | 45 | >60 | >60 |
| Gross density of the air-dry foam (kg/m$^3$) | approx 50 | approx 120 | approx 80 | approx 120 | approx 180 | approx 230 |

(a) Adjustment of the nitrogen pressure in container B to 10 bars

| Example No. | 45 | 46 | 47 | 48 | 49 |
|---|---|---|---|---|---|
| Component A | | | | | |
| Waterglass (type) | 50/52 | 28/30 | 35 | 40/41 | MorsilH |
| Waterglass (quantity used) | 200 | 200 | 200 | 200 | 200 |
| Alkali metal in the waterglass | Na | K | K | K | K |

| Example No. | 45 | 46 | 47 | 48 | 49 |
|---|---|---|---|---|---|
| Emulgin 05 | 5.0 | 5.0 | 5.0 | 5.0 | 5.0 |
| Dichlorodifluoromethane | 50 | 50 | 50 | 50 | 50 |
| Component B | | | | | |
| Glycerol triacetate | 15.0 | 15.0 | 15.0 | 15.0 | 15.0 |
| Nitrogen | (a) | (a) | (a) | (a) | (a) |
| Pot life at RT. minutes | >60 | 15 | 15 | 10 | 45 |
| Gross density of the air-dry foam (kg/m$^3$) | >500 | approx 50 | approx 50 | approx 160 | approx 200 |

(a) Adjustment of the nitrogen pressure in container B to 10 bars.

| Example No. | 50 | 51 | 52 | 53 | 54 |
|---|---|---|---|---|---|
| Component A | | | | | |
| Sodium waterglass 37/40 | 200 | 200 | 200 | 200 | 200 |
| Emulgin 05 | 0.1 | 0.2 | 0.5 | 1.0 | 2.0 |
| dichlorodifluoromethane | 30 | 30 | 30 | 30 | 30 |
| Component B | | | | | |
| Glycerol triacetate | 15 | 15 | 15 | 15 | 15 |
| Nitrogen | (a) | (a) | (a) | (a) | (a) |
| Gross density of the air-dry foam (kg/m$^3$) | — | 85 | 82 | 79 | 72 |
| Foam formation | — | + | + | + | + |
| Foam structure | — | o | + | + | + |

(a) Adjustment of the nitrogen pressure in container B to 10 bars

| Example No. | 55 | 56 | 57 | 58 |
|---|---|---|---|---|
| Component A | | | | |
| Sodium waterglass 37/40 | 200 | 200 | 200 | 200 |
| Emulgin 05 | 3.0 | 4.0 | 5.0 | 10.0 |
| Dichlorodifluoromethane | 30 | 30 | 30 | 30 |
| Component B | | | | |
| Glycerol triacetate | 15 | 15 | 15 | 15 |
| Nitrogen | (a) | (a) | (a) | (a) |
| Gross density of the air-dry foam (kg/m$^3$) | 56 | 53 | 49 | 55(b) |
| Foam formation | + | + | + | + |
| Foam structure | + | + | + | + |

(a) Adjustment of the nitrogen pressure in container B to 10 bars
(b) Drastic reduction in the strength of the foam; foam disintegrates into crumbs

EXAMPLES 59 TO 64

Component A
200.0 g of sodium waterglass solution 37/40
5.0 g of emulsifier (as indicated below)
50.0 g of dichlorodifluoromethane or
200.0 g of sodium waterglass solution 37/40
5.0 g of emulsifier (as indicated below)
20.0 g of propane/butane (35/65)
Component B
15.0 g of glycerol triacetate
1.2 g of nitrogen

| Example No. | 59 | 60 | 61 |
|---|---|---|---|
| Emulsifier (as supplied) | Emulgin 02 liquid | Emulgin 05 liquid | Elfanol 510 paste |
| Propellent CCl$_2$F$_2$: | | | |
| Foam formation | + | + | + |
| Foam stability | +++ | +++ | +++ |
| Foam structure | + | + | — |
| Propellent Propane/butane | | | |
| Foam formation | + | + | + |
| Foam stability | +++ | + | ++ |
| Foam structure | + | + | + |

| Example No. | 62 | 63 | 64 |
|---|---|---|---|
| Emulsifier (as supplied) | Dehyquart C paste | Dehyquart DAM paste | Dehyquart LT liquid |
| Propellent CCl$_2$F$_2$ | | | |
| Foam formation | — | + | + |
| Foam stability | | + | ++ |
| Foam structure | — | | + |
| Propellent Propane/butane | | | |
| Foam formation | + | + | + |
| Foam stability | ++ | + | ++ |
| Foam structure | — | — | + |

The preceding specific embodiments are illustrative of the practice of the invention. It is to be understood however, that other expedients known to those skilled in the art or disclosed herein, may be employed without departing from the spirit of the invention or the scope of the appended claims.

We claim:

1. A process for producing in situ foams based on alkali metal silicates characterized in that (A) an aqueous alkali metal silicate solution containing from 0.1% to 2.56% by weight, based on the amount of said alkali metal silicate solution of an emulsifier which is stable to alkalis and which, when mixed with said alkali metal silicate solution, does not produce any increase in viscosity or any precipitations in said alkali metal silicate solution, said emulsifier being selected from the group consisting of adducts of fatty alcohols with ethylene oxide and monoesters of sulfosuccinic acid with tallow fatty acid monoethanolamide, on the one hand and (B) a hardener solution on the other hand are accomodated in separate pressurized containers A and B, prior to use the hardener solution in container B is added to and mixed with the silicate solution in container A in the presence of a propellent gas liquid under high pressure between 0° and 50° C., and on actuation of the discharge valve of container A, an alkali metal silicate foam is discharged.

2. The process of claim 1 wherein pressurized container A contains a mixture of from 50% to 97% by weight of an aqueous alkali metal silicate solution and from 50% to 3% by weight of said propellent gas liquid under high pressure.

3. The process of claim 2 wherein the total solids content of said aqueous alkali metal silicate solution is between 25% to 50% by weight and said solution at 20° C. has a density of from 1.25 to 1.60 g/cc and a viscosity of from 10 to 5000 mPa.s.

4. The process of claim 1 wherein pressurized container A contains a mixture of from 80% to 95% by weight of an aqueous alkali metal silicate solution and from 20% to 5% by weight of said propellent gas liquid under high pressure.

5. The process of claim 1 wherein said alkali metal silicate is selected from the group consisting of sodium silicate and potassium silicate.

6. The process of claim 5 wherein the mol ratio of $SiO_2$ to $Na_2O$ is between 2:1 to 4:1 and the mol ratio of $SiO_2$ to $K_2O$ is between 2.8:1 to 4:1.

7. The process of claim 6 wherein the total solids content of said aqueous alkali metal silicate solution is between 25% to 50% by weight and said solution at 20° C. has a density of from 1.25 to 1.60 g/cc and a viscosity of from 10 to 5000 mPa.s.

8. The process of claim 5 wherein the mol ratio of $SiO_2$ to $Na_2O$ is between 2.5:1 to 3.5:1 and the mol ratio of $SiO_2$ to $K_2O$ is between 3.2:1 to 3.5:1.

9. The process of claim 5 wherein the total solids content of said aqueous alkali metal silicate solution is between 25% to 50% by weight and said solution at 20° C. has a density of from 1.25 to 1.60 g/cc and a viscosity of from 10 to 5000 mPa.s.

10. The process of claim 1 wherein the total solids content of said aqueous alkali metal silicate solution is between 25% to 50% by weight and said solution at 20° C. has a density of from 1.25 to 1.60 g/cc and a viscosity of from 10 to 5000 mPa.s.

11. The process of claim 8 wherein said viscosity is from 50 to 1000 mPa.s.

12. The process of claim 1 wherein said aqueous alkali metal silicate solution contains compounds being dissolved, emulsified or dispersed therein and being selected from the group consisting of quaternary ammonium compounds, borates, synthetic resins and alkali-compatible organic and inorganic compounds for improving the mechanical strength of the foams.

13. The process of claim 1 wherein said hardeners are selected from the group consisting of inorganic gelating agents and organic gelating agents.

14. The process of claim 13 wherein said organic gelating agent is selected from the group consisting of esters of dicarboxylic acids and glycerol esters of lower alkanoic acid having from 2 to 4 carbon atoms.

15. The process of claim 1 wherein said hardener is glycerol triacetic acid ester.

16. The process of claim 1 wherein said hardener is a mixture of glycerol triacetic acid ester with an oxide or salt of a polyvalent cation.

17. The process of claim 16 wherein said polyvalent cation is selected from the group consisting of Zn, Mg and Ca.

18. The process of claim 1 wherein said hardener solution contains a propellent selected from the group consisting of propellents which are gaseous above 0° C. and mixtures of propellents which are gaseous above 0° C. with propellents which are liquid under pressure at 0° to 50° C.

19. The process of claim 1 wherein the amount and type of said hardener is so selected that the "pot life" of the mixture of hardener and silicate solution is longer than the time required discharge all of said mixture from said pressurized container A.

* * * * *